United States Patent
Eschmann

(10) Patent No.: US 7,721,051 B2
(45) Date of Patent: May 18, 2010

(54) TECHNIQUES TO IMPROVE CACHE PERFORMANCE

(75) Inventor: Michael K. Eschmann, Lees Summit, MO (US)

(73) Assignee: Intel Corporation, Santa Clara, CA (US)

(*) Notice: Subject to any disclaimer, the term of this patent is extended or adjusted under 35 U.S.C. 154(b) by 924 days.

(21) Appl. No.: 10/973,793

(22) Filed: Oct. 25, 2004

(65) Prior Publication Data

US 2006/0090040 A1    Apr. 27, 2006

(51) Int. Cl.
*G06F 12/00* (2006.01)
*G06F 13/00* (2006.01)
*G06F 13/28* (2006.01)

(52) U.S. Cl. ............... 711/143; 711/113; 711/118; 711/126; 711/130; 711/133; 711/134; 711/135

(58) Field of Classification Search ............ 711/103, 711/133–35, 118–146
See application file for complete search history.

(56) References Cited

U.S. PATENT DOCUMENTS

| | | | |
|---|---|---|---|
| 5,754,888 A * | 5/1998 | Yang et al. ............ 710/52 |
| 5,787,473 A * | 7/1998 | Vishlitzky et al. ....... 711/134 |
| 6,412,045 B1 * | 6/2002 | DeKoning et al. ....... 711/135 |
| 6,523,102 B1 * | 2/2003 | Dye et al. .............. 711/170 |
| 6,934,810 B1 * | 8/2005 | Williams et al. ........ 711/137 |
| 2004/0205296 A1 * | 10/2004 | Bearden ................ 711/129 |

OTHER PUBLICATIONS

Richard Golding, Perter Bosch, Carl Staelin, Tim Sullivan, and John Wilkes; Idleness is not Sloth; Proceedings of teh USENIX 1995 Technical Conference Proceedings on USENIX 1995 Technical COnference Proceedings; Year of Publication: 1995; Publisher: USENIX Association, Berkley, CA.*

Richard Golding, Peter Bosch, and John Wilkes; Idleness is not Sloth; This paper is a revised, extended version of a paper presented at the 1995 Winter Usenix conference; Year of Publication: 1996; Publisher: Hewlett Packard Laboratories, Technical Publications Department (Palo Alto, CA).*

Fred Douglis, P. Krishnan, Brian Bershad; Adaptive Disk Spin-down Policies for Mobile Computers; Year of Publication: 1995; Publisher: USENIX Association (Berkley, CA).*

* cited by examiner

*Primary Examiner*—Sanjiv Shah
*Assistant Examiner*—Yaima Campos
(74) *Attorney, Agent, or Firm*—Kacvinsky LLC

(57) ABSTRACT

Method and apparatus to improve cache performance using interarrival times between demand requests are described.

15 Claims, 3 Drawing Sheets

300

300

TECHNIQUES TO IMPROVE CACHE PERFORMANCE

BACKGROUND

A processor-based system such as a computer may use a number of peripheral devices, such as a disk drive. The processing units are typically much faster than the disk drives. Consequently, improving the performance of disk drives may increase the overall performance of the system.

DETAILED DESCRIPTION

Figure 1:
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point (WAP), and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth.

System 100 may be implemented as a wired system, a wireless system, or a combination of both. Although system 100 may be illustrated in the context of a wireless system, it may be appreciated that the principles and techniques discussed herein may also be implemented in a wired system as well. The embodiments are not limited in this context.

When implemented as a wireless system, system 100 may include one or more wireless nodes arranged to communicate information over one or more types of wireless communication media. An example of a wireless communication media may include portions of a wireless spectrum, such as the radio-frequency (RF) spectrum. The wireless nodes may include components and interfaces suitable for communicating information signals over the designated RF spectrum, as illustrated in FIG. 1. The wireless nodes may also include additional components and interfaces that may not necessarily be shown in FIG. 1, such as one or more antennas, wireless RF transceivers, amplifiers, filters, control logic, network interfaces, and so forth. The antenna may comprise, for example, an internal antenna, an omni-directional antenna, a monopole antenna, a dipole antenna, an end fed antenna, a circularly polarized antenna, a micro-strip antenna, a diversity antenna, a dual antenna, an antenna array, and so forth. The embodiments are not limited in this context.

Referring again to FIG. 1, system 100 may comprise a node 102 and a node 104. Each node may include a disk management system (DMS) 106. Although FIG. 1 is shown with a limited number of nodes in a certain topology, it may be appreciated that system 100 may include more or less nodes in any type of topology as desired for a given implementation. The embodiments are not limited in this context.

In one embodiment, nodes 102 and 104 may be implemented as, for example, wireless nodes. Examples of a wireless node may include a mobile or cellular telephone, a computer such as a desktop, laptop or portable computer equipped with a wireless access card or modem, a PDA, a web tablet, a digital music player, a digital camera, a pager, an integrated cellular telephone/PDA, and so forth. In one embodiment, for example, one or more wireless nodes may comprise wireless devices developed in accordance with the Personal Internet Client Architecture (PCA) by Intel® Corporation. The embodiments are not limited in this context.

In one embodiment, nodes 102 and 104 may each include a DMS 106. DMS 106 may include a disk system having one or more disk drive storage devices, and one or more disk caches for use with the disk drives. DMS 106 may also include one or more disk controllers. As discussed in more detail below, the disk controller may be modified to improve the performance of DMS 106, as well as the overall performance of system 100.

As previously discussed, peripheral devices such as disk drives used in processor-based systems may be slower than other circuitry in those systems. The processing units and the memory devices in systems are typically much faster than disk drives. Therefore, there have been many attempts to increase the performance of disk drives. Because disk drives are electromechanical in nature, however, there may be a finite limit beyond which performance cannot be increased.

One way to reduce the information bottleneck at the peripheral device, such as a disk drive, is to use a disk cache. A cache is a memory location that logically resides between a device, such as a disk drive, and the remainder of the processor-based system, which could include one or more processing units and/or computer buses. Frequently accessed data resides in the cache after an initial access. Subsequent accesses to the same data may be made to the cache instead of the disk drive, reducing the access time since the cache memory is much faster than the disk drive. The cache for a disk drive may reside in the computer main memory or may reside in a separate device coupled to the system bus, for example.

Disk drive data that is used frequently can be inserted into the cache to improve performance. In some cases, information may be taken and stored in the disk cache without immediately updating the information in the disk drive. Information may be periodically written back from the disk drive to the disk storage in accordance with a write back policy. This may sometimes be referred to as a "lazy write." Such write backs may be scheduled to occur when the system is idle and such write backs would otherwise not adversely affect performance and during power cycles.

One problem with write backs is that a file system may send a demand request for data from the disk drive during a write back operation. As a result, the write back operation may delay processing the demand request. Thus, there may be a need for alternate ways of writing back data from disk caches to disk drives while reducing delays in processing incoming demand requests.

DMS 106 attempts to solve these and other problems. Since demand requests typically occur at regular cadences, DMS 106 may be arranged to predict the arrival of subsequent demand requests from the patterns formed by previous demand requests. For example, DMS 106 may determine a delay interval between demand requests for a disk drive. The delay interval may comprise, for example, an average time interval calculated using the interarrival times for previously received demand requests. An interarrival time may comprise the period of time between any two successive demand requests. DMS 106 may write back data from a cache to the disk drive using the delay interval. In this manner, the availability of disk drives may be improved by reducing the probability that write back operations are being performed when a demand request needs service. System 100 in general, and DMS 106 in particular, may be described in more detail with reference to FIGS. 2-3.

Figure 2:
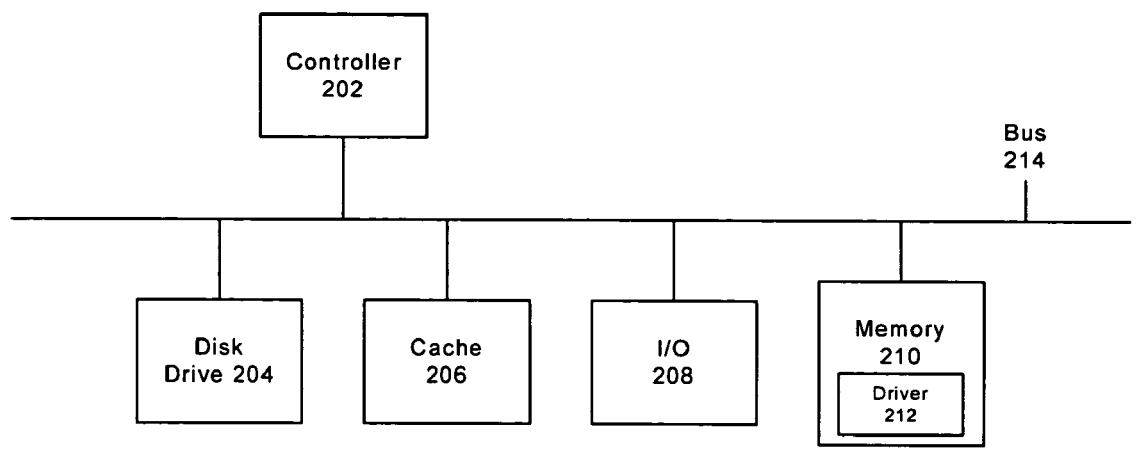
FIG. 2 illustrates a partial block diagram of a disk management system 106.

FIG. 2 illustrates a partial block diagram of DMS 106. As shown in FIG. 2, DMS 106 may comprise multiple elements, such as a controller 202, a disk drive 204, a disk cache 206, an input/output (I/O) device 208, and a memory 210, all connected by a bus 214. Some elements may be implemented using, for example, one or more circuits, components, registers, processors, software subroutines, or any combination thereof. Although FIG. 2 shows a limited number of elements, it can be appreciated that more or less elements may be used in DMS 106 as desired for a given implementation. The embodiments are not limited in this context.

In one embodiment, DMS 106 may include controller 202. Controller 202 may be any general purpose or dedicated processor, such as one or more microprocessors, digital signal processors, microcontrollers, network processors, I/O processors, and so forth. The embodiments are not limited in this context.

In one embodiment, DMS 106 may include disk drive 204. Examples for disk drive 204 may include a magnetic or optical disk drive. The embodiments are not limited in this context.

In one embodiment, DMS 106 may include disk cache 206. Disk cache 206 may be implemented using any type of non-volatile memory, such as static random access memory, programmable read only memory (PROM), erasable PROM (EPROM), electrically EPROM (EEPROM), flash memory, a polymer memory such as ferroelectric polymer memory, an ovonic memory, and so forth. The embodiments are not limited in this context.

In one embodiment, DMS 106 may include I/O 208. I/O 208 may comprise an input device, such as a keyboard, a keypad, an audio recorder, a touch screen, a microphone, and so forth. I/O device 208 may also comprise an output device, such as a display, one or more light emitting diodes (LED), a speaker, an audio reproducing device, and so forth. I/O device 208 may be used to generate a message. Node 102 and/or 104 may communicate the message using a network interface, such as a radio transceiver. The embodiments are not limited in this context.

In one embodiment, DMS 106 may include memory 210. Memory 210 may be implemented using any of the non-volatile memory described with reference to disk cache 206. Memory 210 may also comprise any conventional volatile memory, such as random access memory and its variants. Memory 210 may be used to store messages to be transmitted to or by DMS 106. Memory 210 may also be used to store instructions that are executed by the controller 202 during operations for DMS 106, as well as for storing user data. Although memory 210 and cache 206 are shown as separate memory units, it may be appreciated that memory 210 and cache 206 may be implemented using the same memory unit and still fall within the scope of the embodiments.

In one embodiment, memory 210 may also include a driver 212. Driver 212 may be used to implement a cache write back policy in which data is flushed or evicted from non-volatile disk cache 206, and written back to disk drive 204 upon the occurrence of particular events. In general, the write back policy may use a delay interval to control when write backs are executed, thereby reducing the possibility that a write back may be in operation when a demand request needs service. This may reduce delays in servicing incoming demand requests, which may improve the overall performance of DMS 106.

In one embodiment, driver 212 may monitor and record the interarrival times between demand requests. The interarrival times may be input into an adaptive algorithm that continuously updates a moving average over some time period or a previous number of interarrival times. The moving average may therefore represent an average interarrival time for demand requests. Driver 212 may output a delay interval comprising the moving average.

Driver 212 may determine the delay interval using Equation (1) as follows:

$$Ts = F(T(n)), T(n-k) \qquad (1)$$

A more detailed example of Equation (1) may be illustrated in Equation (2) as follows:

$$Ts = T_s = \frac{1}{k} \sum_{i=n-k+1}^{n} T_i - T_{i-1}) \qquad (2)$$

As illustrated in Equations (1) and (2), Ts may represent the speculative delay interval. The calculation of Ts may be performed using an estimating operation of when the next future demand request will arrive. Equation (2) is an example of an equation that may be used to determine an average of the previous k interarrival times as measured by the time from when a first demand request arrives until a second demand request arrives in succession. This example is adaptive since it tracks how fast recent demand requests have arrived, and uses this information to estimate when to begin write back operations. It may be appreciated that Equations (1) and (2) are provided by way of example only, and any type of estimation function may be used and still fall within the scope of the embodiments.

In one embodiment, the delay interval may be used to determine when to begin write backs from disk cached 206 to disk drive 204. Driver 212 may start a timer once all outstanding demand requests have been completed. If a demand request is not received by DMS 106 before expiration of the delay interval, driver 212 may initiate a writing data from disk cache 206 to disk drive 204. An example of writing data may include a write back operation. If a demand request is received by DMS 106 before expiration of the delay interval, however, driver 212 may prevent execution of write back operations thereby allowing the new demand request to be serviced by DMS 106. Driver 212 may then update the moving average used as the delay interval, and restart the timer once all outstanding demand requests have been completed. DMS 106 may continue to operate in this manner until driver 212 is terminated by an internal or external event.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 3:
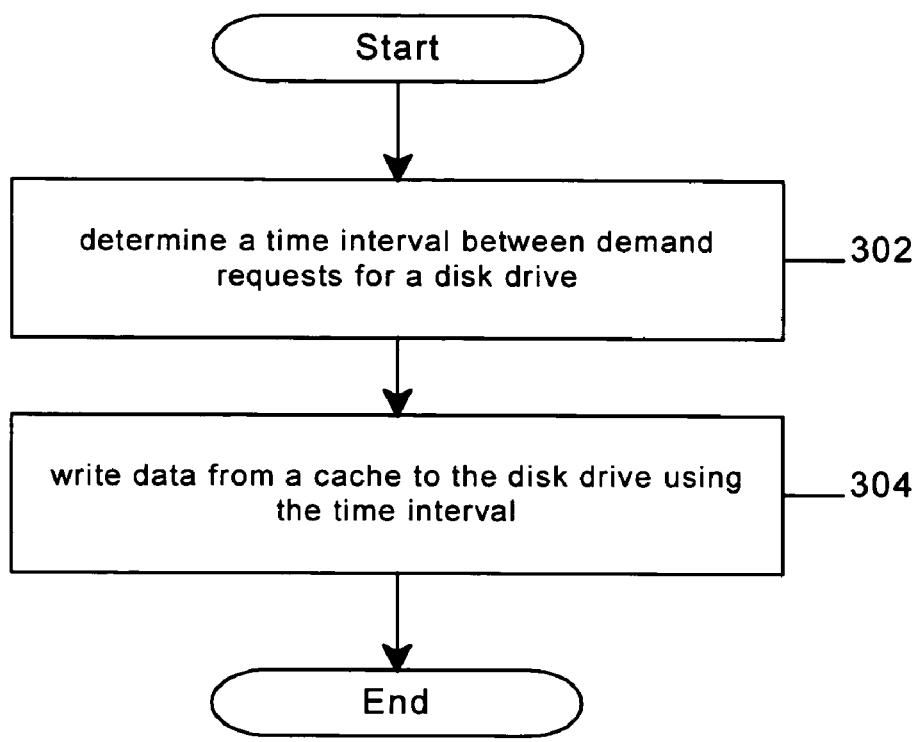
FIG. 3 illustrates a block diagram of a programming logic 300.

FIG. 3 illustrates a programming logic 300. Programming logic 300 may be representative of the operations executed by one or more systems described herein, such as system 100 and/or subsystem 200. As shown in programming logic 300, a delay interval between demand requests for a disk drive may be determined at block 302. The determination at block 302 may be performed using a k number of previous interarrival times. The embodiments are not limited in this context.

Data may be written from a cache to a disk drive using the delay interval at block 304. For example, data may be written from the cache to the disk drive at an end of the delay interval. The data may comprise any data, such as data identified as "dirty" logical data. Dirty logical data may include data that has been updated in the cache but has yet to be written to the disk drive. If a demand request is received during the delay interval, write operations may be disabled in response to the demand request to allow the demand request to be serviced. The delay interval may be updated for each demand request. The cache may be implemented using, for example, non-volatile memory to form a non-volatile cache. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processor-based system or platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A system, comprising:
a cache;
a disk drive to connect to said cache; and
a controller to connect to said cache and said disk drive, said controller to determine a delay interval between demand requests, the delay interval comprising an average time interval calculated using a period of time between any two successive previously received demand requests, and write data from said cache to said disk drive using said delay interval; and
said controller to receive a demand request during said delay interval, and to disable write operations in response to said demand request and said controller to update said delay interval for each demand request.

2. The system of claim 1, said controller to begin to write data from said cache to said disk drive at an end for said delay interval.

3. The system of claim 1, said controller to determine said delay interval using a k number of previous interarrival times.

4. The system of claim 1, said controller to identify dirty data to perform said write.

5. The system of claim 1, said cache comprising a non-volatile cache.

6. A method, comprising:
 determining a delay interval between demand requests for a disk drive based on an average time interval calculated using a period of time between any two successive previously received demand requests;
 writing data from a cache to said disk drive using said delay interval;
 receiving a demand request during said delay interval, and temporarily disabling write operations in response to said demand request; and
 updating said delay interval for each demand request.

7. The method of claim 6 including writing data from said cache to said disk drive at an end for said delay interval.

8. The method of claim 6 including determining said delay interval using a k number of previous interarrival times.

9. The method of claim 6 including identifying dirty logical data to perform said writing.

10. The method of claim 6 including writing data from a non-volatile cache.

11. An article comprising a medium storing instructions that when executed by a processor are operable to determine a delay interval between demand requests for a disk drive based on an average time interval calculated using a period of time between any two successive previously received demand requests, write data from a cache to said disk drive using said delay interval, receive a demand request during said delay interval, temporarily disable write operations in response to said demand request and update said delay interval for each demand request.

12. The article of claim 11 further storing instructions that when executed by a processor are operable to write data from said cache to said disk drive at an end for said delay interval.

13. The article of claim 11 further storing instructions that when executed by a processor are operable to determine said delay interval using a k number of previous interarrival times.

14. The article of claim 11 further storing instructions that when executed by a processor are operable to identify dirty logical data to perform said writing.

15. The article of claim 11 further storing instructions that when executed by a processor are operable to write data from a non-volatile cache.

* * * * *

UNITED STATES PATENT AND TRADEMARK OFFICE
CERTIFICATE OF CORRECTION

PATENT NO. : 7,721,051 B2
APPLICATION NO. : 10/973793
DATED : May 18, 2010
INVENTOR(S) : Michael K. Eschmann It is certified that error appears in the above-identified patent and that said Letters Patent is hereby corrected as shown below:

On the Title page, in field (56), under "Other Publications", in column 2, line 1, delete "Perter" and insert -- Peter --, therefor.

On the Title page, in field (56), under "Other Publications", in column 2, line 2, delete "teh" and insert -- the --, therefor.

On the Title page, in field (56), under "Other Publications", in column 2, line 4, delete "COnference" and insert -- Conference --, therefor.

Signed and Sealed this

Third Day of August, 2010

David J. Kappos
*Director of the United States Patent and Trademark Office*